United States Patent [19]

Cruden et al.

[11] 4,176,103

[45] Nov. 27, 1979

[54] POLYMER LATICES

[75] Inventors: John M. Cruden; Alan J. Bignold, both of Harlow; Roger H. Green, Chelmsford; Ronald J. Grisenthwaite, Harlow, all of England

[73] Assignee: Harlow Chemical Company Limited, Harlow, England

[21] Appl. No.: 412,967

[22] Filed: Nov. 5, 1973

[30] Foreign Application Priority Data

Nov. 16, 1972 [GB] United Kingdom .............. 53001/72
Jul. 9, 1973 [GB] United Kingdom .............. 32517/73

[51] Int. Cl.$^2$ .............................................. C08L 29/00
[52] U.S. Cl. ...................... 260/29.6 RW; 260/29.2 N; 260/29.6 WB; 260/29.6 T; 260/29.6 TA; 260/29.6 MN; 260/561 H; 260/566 B; 428/522
[58] Field of Search ............. 260/29.6 RB, 29.6 RW, 260/29.6 TA, 29.6 T, 29.6 MN, 561 H, 566 B, 29.2 TN, 29.2 N

[56] References Cited

U.S. PATENT DOCUMENTS

| | | | |
|---|---|---|---|
| 3,262,985 | 7/1966 | Müller et al. | 260/29.6 TA X |
| 3,520,804 | 7/1970 | Hoke | 210/23 |
| 3,560,452 | 2/1971 | Schulze et al. | 260/78 TF |
| 3,718,625 | 2/1973 | Wallrabenstein et al. | 260/29.2 N |
| 3,796,773 | 3/1974 | Coleman | 260/879 |
| 3,809,675 | 5/1974 | Hansen | 260/566 B |
| 3,896,073 | 7/1975 | Smith | 260/29.6 RW |

OTHER PUBLICATIONS

Machida, *Chemical Abstracts*, vol. 71:113,814(c), (1969).
Machida et al., *Chemical Abstracts*, vol. 67:54,492(p), (1967).
Pankratova et al., *Chemical Abstracts*, vol. 80:48,554n (1974).
March, *Advanced Organic Chemistry: Reactions, Mechanisms and Structure*, McGraw-Hill Book Co., N.Y. (1968), pp. 656-658.

*Primary Examiner*—Walter C. Danison
*Attorney, Agent, or Firm*—Brisebois & Kruger

[57] ABSTRACT

The adhesion, especially wet adhesion, properties of conventional polymer latices are greatly improved by the incorporation of groups derived from the reaction of carbonyl groups with hydrazines therein. The hydrazine-modified groups can be present in any component of the polymer latex, but are advantageously part of the main polymer itself. Preferred main polymers are therefore those containing carbonyl units capable of reacting with hydrazine or a substituted hydrazine, especially copolymers of N-3-oxyhydrocarbon-substituted acrylamides such as diacetone acrylamide. Significantly improved wet adhesion properties are obtained even with very low proportions of the hydrazone-modified groups.

17 Claims, No Drawings

POLYMER LATICES

BACKGROUND OF THE INVENTION

This invention relates to polymer latices and the use of such latices in coating and binder compositions such, for example, as paints, adhesives, paper coating and textile coating, the term "latex" being used herein in a broad sense to designate any, generally aqueous, dispersion of a water-insoluble polymer, the polymer being present in the form of particles.

Coating compositions based on high polymer latices, such as those mentioned above, are widely used in protective and decorative applications and have many advantages such as durability, abrasion resistance, ease of handling and application. However, although the dry adhesion of these coatings to most substrates is adequate, wet adhesion is frequently inadequate, particularly when the coatings are applied on certain difficult surfaces. A familiar example of poor wet adhesion is the unsatisfactory performance of most emulsion paints when these are applied over old alkyd or oil gloss paint. Under conditions of high humidity, such as may occur in kitchens and bathrooms, water vapour may penetrate the emulsion paint film and when the interface between the two paint surfaces becomes wet, adhesion failure may take place. Similarly, binder compositions based on said latices, whilst generally displaying good dry adhesion properties, do not generally have adequate wet adhesion characteristics.

Several modifications of high polymer latices have been proposed to give improved wet adhesion, but in most cases the extent of the improvements is much less than is necessary and even when an adequate increase in adhesion is obtained, there may be objections to the modification. For instance, according to British Patent No. 1,088,105, it is possible to obtain greatly enhanced wet adhesion by treating certain latices with ethylenimine, but the handling of this very toxic chemical is extremely hazardous, and side reactions of the ethylenimine with acetaldehyde produced by the hydrolysis of vinyl acetate monomer may lead to an unacceptable discolouration in polyvinyl acetate latices.

It has been proposed to improve the dry adhesion of coating compositions for certain substrates by incorporating polar groups, e.g. carboxyl, amido, hydroxyl, glycidyl and ureido groups, into the basic polymer of the latex. However, none of these groups (apart, possibly, from the ureido group) gives any appreciable increase in wet adhesion.

SUMMARY OF THE INVENTION

The present invention is based on our surprising discovery that hydrazine-modified polymer latex compositions show greatly improved wet adhesion properties. It is thought that these latices, which are generally prepared by utilising the reaction between a substituted or unsubstituted hydrazine and a keto- or aldehyde group, thereby contain hydrazone groups which lead to the improved wet adhesion properties and, for convenience, reference will be made in this specification to hydrazone groups. It will be appreciated, however, that the present invention is not intended to be limited by the precise nature of the group or groups formed, for example, when hydrazine itself is employed it is possible that at least a proportion of azine linkages will result may also contribute to improved adhesion.

DESCRIPTION OF PREFERRED EMBODIMENTS

The hydrazone group, which may be substituted or unsubstituted, is advantageously incorporated into the main polymer of the latex. This may be achieved before, during or after formation of the polymer latex by reaction of the corresponding hydrazine with carbonyl groups in one or more polymer precursors and/or with carbonyl groups in the final polymer, respectively.

Alternatively, the corresponding hydrazine may be reacted with another component of the polymer latex, e.g. a protective colloid or a stabiliser containing carbonyl groups. Again this may be carried out before, during or after formation of the polymer latex.

Another method of carrying out the present invention is to prepare a water-soluble polymer, e.g. an alkali soluble resin, containing hydrazone groups and to incorporate this with the polymer latex. Alternatively a second polymer latex could be prepared containing hydrazone groups, said second latex then being incorporated with the first polymer latex.

Yet another method of carrying out the present invention is to incorporate a preferably water-soluble or water-dispersible additive comprising a reaction product of a simple saturated carbonyl compound, especially a ketone and a hydrazine, especially hydrazine itself. Amongst suitable additives there may especially be mentioned the reaction products of hydrazine with acetone, methyl ethyl ketone and diacetone alcohol. These additives can be incorporated at any suitable stage in the preparation of the polymer latex. The amount of additive required to give the desired wet adhesion properties in any given latex can readily be determined by experiment. In practice we have found that only very small amounts are necessary to give significant improvements in wet adhesion properties.

When the hydrazone groups are incorporated into the main polymer of the latex the latter will, in general, contain units derived from an active ketone or an active aldehyde, that is to say, a ketone or an aldehyde which, apart from its carbonyl group, contains another functional moiety, e.g. a carbon-to-carbon double bond, which facilitates homopolymerisation, or copolymerisation with other monomers, especially other olefinically unsaturated monomers, to form the polymer resin.

The ketone or aldehyde and/or the other monomer(s) may advantageously contain other polar groups.

Amongst suitable carbonyl compounds which may be used there may be mentioned oxohydrocarbon-substituted unsaturated amides, especially N-3-oxohydrocarbon-substituted acrylamides, e.g. those having the formula

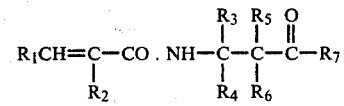

wherein $R_1$ represents hydrogen, a lower alkyl, e.g. methyl, radical or the group

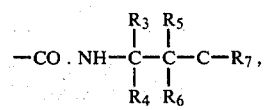

$R_2$ represents hydrogen, a lower alkyl, e.g. methyl, radical or the group

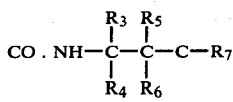

wherein $R_3$, $R_4$, $R_5$ and $R_6$, any two or more of which may be the same or different, each represents hydrogen or a hydrocarbon radical and $R_7$ represents a hydrocarbon radical, As used herein the term "hydrocarbon radical" includes alkyl, cycloalkyl, aryl, aralkyl and alkaryl radicals. It also includes radicals containing substituents such as halogen, ether, ester and nitro groups so long as these substituents do not significantly alter the character or reactivity of the radical. The term "lower alkyl" includes alkyl radicals containing upto 10, preferably upto 4, carbon atoms.

Such compounds, their preparation and their use in forming interpolymers with a large variety of other comonomers are fully described in U.S. Pat. Nos. 3,277,056 (British Patent No. 1,045,869) and 3,452,942, the disclosures of which are incorporated herein by reference. Especially preferred, because of its commercial availability, is N-(1,1-dimethyl-3-oxobutyl) acrylamide, known as diacetone acrylamide, which has the formula

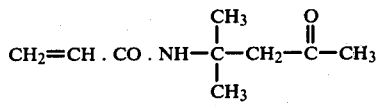

but other N-3-oxyhydrocarbon-substituted acrylamide, e.g. diacetone methacrylamide, diacetophenone acrylamide and the product of the reaction between acrylonitrile, methyl ethyl ketone and sulphuric acid, hereinafter called di(methyl ethyl ketone)acrylamide, would be equally suitable.

Amongst other carbonyl monomers which may be used to prepare polymer latices in accordance with the present invention there may be mentioned:

(a) oxoalkyl esters of unsaturated acids, e.g. 1,1-dimethyl-3-oxobutyl acrylate;

(b) alkylalkenyl ketones, e.g. methyl vinyl ketone;

(c) alkenyl and arylalkenyl aldehydes, e.g. acrolein, crotonaldehyde and cinnamaldehyde;

(d) vinyl esters of keto-acids, e.g. vinyl acetoacetate; and (e) olefinically unsaturated keto- and aldehyde-terpenes.

The above carbonyl monomers can, in all cases, be reacted in conventional manner with the appropriate hydrazine to give the required hydrazine-modified component.

As mentioned above, hydrazine itself is especially preferred to form the hydrazone components used in the present invention, but methyl hydrazine can also be effectively employed and it is thought that other substituted hydrazines having, for example, the general formula

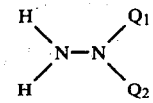

wherein $Q_1$ represents hydrogen or an alkyl or hydroxyalkyl group, especially a methyl or hydroxymethyl group, and $Q_2$ represents hydrogen or a hydrocarbon group, as hereinbefore defined, will also be useful.

As stated above it will, in general, be possible to incorporate the hydrazone groups before, during or after formation of the polymer of the latex. For example, the hydrazone of the ketone or aldehyde monomer may be prepared and then copolymerised in the normal way with other monomers to prepare a copolymer resin. Alternatively the ketone or aldehyde may be copolymerised with the other monomer(s) in the presence of the appropriate hydrazine; or the copolymer of the ketone or the aldehyde and the other monomer(s) may first be prepared in aqueous dispersion and then the hydrazone prepared by reaction with the appropriate hydrazine. The same criteria apply in the case where the hydrazone groups are incorporated into other components of the polymer latex, e.g. protective colloids or stabilisers.

Alternatively, a water soluble polymer resin may be prepared and then incorporated with polymer latex. Again this may be done before, during or after formation of the latex. The polymer could, for example, be a copolymer of vinyl acetate, crotonic acid and diacetone acrylamide hydrazone in alkaline solution.

The present invention also provides a polymer containing hydrazone groups, more especially a copolymer, with one or more other comonomers, of a hydrazone of an olefinically unsaturated ketone or aldehyde, preferably a hydrazone of oxohydrocarbon-substituted unsaturated amide, especially diacetone acrylamide hydrazone. The present invention also provides diacetone acrylamide hydrazone, i.e. the reaction product of diacetone acrylamide and hydrazine.

It will be appreciated that the term "copolymer" as used herein is intended to include graft polymers, e.g. those where the hydrazine-modified monomer is grafted onto an existing polymer backbone.

Only very small amounts of hydrazone groups need be incorporated into the polymer latices to bring about significant improvements in wet adhesion. We have found that the addition of hydrazine to give amounts of hydrazine-modified carbonyl groups corresponding to 0.01% by weight of nitrogen based on the weight of the latex solids bring about improved wet adhesion and even lower amounts may be useful. In general, however, it is thought that the hydrazine-modified carbonyl groups should be present in an amount of from 0.1% to 1%, especially about 0.3%, calculated on the above basis. It will be appreciated, however, that the upper proportion of these groups is limited only by the other characteristics desired of the latex.

As disclosed in the aforementioned U.S. Pat. Nos. 3,277,056 and 3,452,942 a very wide range of monomers can be copolymerised with diacetone acrylamide to form useful polymer latices. In general the most suitable comonomers for the purposes of the present invention will be ethylenically unsaturated and can be divided into two types, the first of which comprises those monomers which may conveniently be polymerised to form the major part of the dispersed polymer resin, the second of which comprises those monomers which may be used in conjunction with the first type to obtain some especially desirable resin property.

Monomers which fall into the first of these categories include vinyl esters of carboxylic acids, e.g. vinyl acetate, vinyl propionate, vinyl pivalate and the vinyl esters of mixed tertiary $C_{10}$ carboxylic acid VeoVa 10; esters of acrylic or methacrylic acid, e.g. ethyl acrylate, butyl acrylate, 2 ethyl hexyl acrylate, methyl methacrylate and ethoxyethyl methacrylate; vinyl aromatic compounds, e.g. styrene, vinyl toluene and chlorostyrene, conjugated dienes, e.g. butadiene and isoprene; vinyl and vinylidene halides; and acrylonitrile and methacrylonitrile.

Monomers in the second category include the mono and diesters of maleic, fumaric and itaconic acids, e.g. dibutyl maleate, mono butyl maleate, diethyl fumarate, dimethyl itaconate and mono butyl itaconate; ethylene and higher alpha olefine, e.g. but-1-ene, isobutene and dec-1-ene; allyl compounds, e.g. allyl acetate, esters of crotonic acid, e.g. methyl crotonate; and alpha methyl styrene. Also included in this group are potentially reactive monomers including unsaturated carboxylic acids, e.g. acrylic, methacrylic, maleic, fumaric, itaconic, crotonic and cinnamic acids; acrylamide, methacrylamide and their N substituted derivatives, e.g. N-methylol-acrylamide and N-butoxy-methacrylamide; hydroxyalkyl esters of polymerisable unsaturated acids; and glycidyl esters of polymerisable unsaturated acids.

It will be appreciated, however, that the specific composition of the polymer particles in the latex is not critical.

The polymer latices of the present invention will in general be prepared in the presence of stabilisers which may include high molecular weight colloids and ionic and nonionic surfactants used singly or in combination. Typical high molecular weight colloids suitable for this purpose are hydroxyethyl cellulose, polyvinyl alcohol and alkali soluble acrylic copolymers. The ionic surfactants which may be either anionic or cationic include such materials as sodium lauryl sulphate, sodium di-2-ethyl hexyl sulphosuccinate or cetyl trimethyl ammonium bromide. Typical nonionic surfactants are condensates of ethylene oxide with alkyl phenols or fatty alcohols.

As mentioned above, it may in some cases be desirable to react the hydrazine with the protective colloid or the stabiliser rather than with the polymer itself.

The polymer latices may be prepared by methods known per se. Suitable methods are, for example, described in the aforementioned U.S. Pat. No. 3,277,056 and also in U.S. Pat. Nos. 3,520,804 and 3,585,125. A free radical source is used as a polymerisation initiator; these catalysts are well known and any such catalyst may be used in the present process. This initiator may be used as a single compound or as a mixture and can be water soluble or oil soluble. Examples of suitable catalysts are ammonium peroxydisulphate potassium peroxydiphosphate, benzoylperoxide and azobisbutyronitrile. A catalyst activator, e.g. sodium formaldehyde sulphoxylate, may also be used and chain-transfer agents, e.g. carbon tetrachloride or n-dodecyl mercaptan may also be present.

The polymerisation is carried out by dispersing the reactants in water in presence of the stabilisers to form an emulsion and the process of polymerisation may be batchwise, continuous or semi-batch.

The coating compositions derived from these modified polymer latices may include such materials as pigments, extenders, thickeners, dispersing agents, wetting agents, defoamers, solvents and plasticisers and any other additives which may be relevant to the application for which the coating is intended.

It will be appreciated that, according to the present invention, the improved wet adhesion properties derive from the hydrazine-modification of the polymer latices. That is to say, it is not necessary for the purposes of the present invention that the main polymer used in the latices should itself be modified in any other way so as to give improved wet adhesion properties. Thus the present invention does not envisage, for example, the use of imminated carboxylic polymers which have hitherto been used in an attempt to obtain good wet adhesion properties.

It should also be stressed that the polymer latices and polymers of the present invention exhibit other improved properties. Thus, for example, as illustrated in the following Examples the hydrazine-modification often leads to improved dry adhesion properties which can usefully be employed in, for example, the manufacture of tyres and tyre cords, etc.

The following Examples illustrate the invention.

EXAMPLE 1

This Example illustrates the preparation of a hydrazine-modified graft copolymer latex by a graft copolymerisation of diacetone acrylamide hydrazone onto a preformed acrylic polymer, and compares the wet adhesion properties of the modified graft polymer latex and the acrylic polymer latex.

| Latex A Component | | Amount |
|---|---|---|
| 1 | Butyl acrylate | 137 g |
| 2 | Methyl methacrylate | 108 g |
| 3 | Soft water | 210 g |
| 4 | Dowfax 2A1 (45%) (Sodium salt of dodecyldiphenyl ether disulphonic acid ex Dow Chemical Co.) | 2 g |
| 5 | Tergitol NP 35 (A condensate of an alkyl phenyl ether with 15 moles/mole of ethylene oxide ex Union Carbide) | 5 g |
| 6 | Soft water | 20 g |
| 7 | Methacrylic acid | 5 g |
| 8 | Aqueous ammonia (Specific gravity 0.910 | 3.5 g |
| 9 | Dowfax 2A1 (45%) | 3.5 g |
| 10 | 10% Aqueous ammonium persulphate | 6 ml. |

A latex of the above composition was prepared as follows. Components 3, 4 and 5 and a mixture of 10% by weight of components 1 and 2 were placed in a reaction vessel fitted with a stirrer and a condenser and heated with stirring to 70° C. 1 ml. of component 10 was added and the temperature was raised to 90° C. for 30 minutes. Then a delayed addition of the remainder of components 1 and 2 and of a mixture of components 6, 7, 8 and 9 was begun at such a rate as to complete the addition in 2 hours. During the delayed addition 1 ml. portions of component 10 were added after 0, 30, 60, 90 and 120 minutes the temperature being maintained at 90° C. throughout. When the addition was completed the emulsion was stirred at 90° C. for a further 30 minutes and then was cooled and sieved to remove a small amount of coagulum. The resulting fine particle size emulsion had a solids content of approximately 51% by weight.

Part of the resulting latex A was then taken to prepare a graft copolymer with diacetone acrylamide hydrazone.

To make a latex of the graft copolymer the following components were used:

| Component | | Amount |
|---|---|---|
| 1 | Latex A | 150 g |
| 2 | Water | 10 g |
| 3 | Tertiary butyl hydroperoxide | 0.1 ml |
| 4 | Diacetone acrylamide hydrazone (prepared by standard methods from diacetoneacrylamide ex Lubrizol Chemical Corporation) | 2 g |
| 5 | Methyl methacrylate | 8 g |
| 6 | 10% Aqueous sodium formaldehyde sulphoxylate | 1.5 ml |

The graft copolymer latex was prepared as follows. Components 1, 2 and 3 were placed in a reactor vessel and stirred for 5 minutes. A solution of component 4 in component 5, which had been warmed slightly to effect complete solution, was added slowly and the mixture was again stirred for 5 minutes. Component 6 was then added and the resulting latex was stirred at room temperature for 2 hours.

In order to compare the wet adhesion properties of latex A and the graft copolymer latex paints were prepared according to the following formulation

| | |
|---|---|
| Tioxide RHD 2 (British Titan Products) | 203.0 |
| Microdol 1 (Norwegian Talc) | 77.0 |
| Micro Talc AT1 (Norwegian Talc) | 25.0 |
| Cellofas B 50 (3% soln.) (carboxymethyl cellulose from I.C.I.) | 101.5 |
| Crotan 731 (Dispersing agent from Rohm & Haas | 10.1 |
| Tetron (Tetrasodium pyrophosphate) | 1.0 |
| Ammonia SG 0.910 | 1.0 |
| Hercules Defoamer 1512 | 2.5 |
| Nuodex 321 Extra (fungicide and bactericide from Durham Chemicals) | 0.5 |
| Nonidet P 80 (A condensate of an octylphenol with 11.5 moles of ethylene oxide ex Shell Chemicals) | 1.0 |
| Water | 85.4 |
| Disperse and then add | |
| Dalpad A (coalescing solvent from Dow Chemicals) | 10.0 |
| Latex (adjusted to 51% total solids) | 432.0 |
| Water | 50.0 |
| | 1000.0 |
| Pigment Volume Concentration | 30% (app.) |
| Total Solids | 53% |

The wet adhesion of the paints was then tested by the following Test 1.

The paints were applied on one side of 6"×4" panels finished with alkyd gloss paint, to give a dry film thickness of 0.001" for the experimental paints. After drying for 48 hours these panels were placed in a specially constructed lid fitted over a humidity cabinet (spec. DEF 1053), so that the emulsion paint surface was placed downwards and exposed to condensation while the outer surface was cooled by a cold water reservoir placed on the reverse side of the panel.

The humidity cabinet is operated so that it cycles between 42° C. and 48° C. every half hour in conditions of constant condensation. The adhesion of the emulsion paint to the underlying alkyd is estimated by pressing the paint with the thumb, applying a rotary movement and observing any movement of the emulsion paint film which would indicate loss of adhesion.

Paint films were examined at 5 minute intervals and the paint prepared from the unmodified emulsion, i.e. latex A, was seen to lose adhesion after 5 minutes. By comparison, the paint based on the emulsion containing the diacetone acrylamide hydrazone graft copolymer showed no adhesion failure over a period of 20 hours.

EXAMPLE 2

This Example illustrates the formation of an acrylic/diacetone acrylamide copolymer latex followed by modification by the addition of hydrazine; the wet adhesion properties of the modified and unmodified copolymer latices are compared.

| Latex B | | |
|---|---|---|
| Component | | Amount |
| 1 | Methyl methacrylate | 110 g |
| 2 | Butyl acrylate | 125 g |
| 3 | Methacrylic acid | 5 g |
| 4 | Diacetoneacrylamide | 10 g |
| 5 | Hard water | 216 g |
| 6 | Dowfax 2A1 (45%) | 2 g |
| 7 | Nonidet P 80 (A condensate of an octylphenol with 11.5 moles of ethylene oxide ex Shell Chemicals) | 2.5 g |
| 8 | 10% Aqueous ammonium persulphate | 1.3 ml |
| 9 | Dowfax 2A1 (45%) | 4 g |
| 10 | Hard Water | 24 g |
| 11 | Ammonium persulphate | 0.5 g |

A latex of the above composition was prepared as follows.

Components 5, 6 and 7 and 17% by weight of the mixture of monomers 1, 2, 3 and 4 were introduced into a reaction vessel and heated with stirring to 70° C. Component 8 was then added and the temperature was raised to 90° C. After 30 minutes, delayed addition of the remainder of components 1, 2, 3 and 4 was effected over a period of 2 hours and a mixture of components 9, 10 and 11 was added in over a period of 2¼ hours, the temperature being maintained at 90° C. When the additions had been completed the resulting emulsion was heated for a further 30 minutes at 90° C. It was then cooled and sieved to remove any coagulum and sufficient concentrated ammonia solution was added to raise the pH to 4. The resultant latex B had a solids content of about 51%. Part of latex B was then used to prepare a latex containing hydrazone groups, as follows.

A solution of hydrazine hydrate (1.2 g) in water (5 g) was added to a solution of concentrated sulphuric acid (1.6 g) in water (5 g). The pH of the resultant mixture was raised to 4 by the addition of solid sodium acetate. This solution was then added to 200 g of latex B and the mixture was heated at 60° C. with stirring over a period of 30 minutes. After cooling, concentrated ammonia was added to raise the pH to 8. The latex of the hydrazone copolymer obtained had a solids content of about 47% by weight.

Paints were then made and tested as described in Example 1. Once more, the unmodified emulsion, latex B, suffered adhesion failure in 5 minutes whilst the hydrazine modified emulsion showed no adhesion failure even after 20 hours.

EXAMPLE 3

This Example compares the wet adhesion properties of a polymer latex (a), and similar latices modified by the incorporation of hydrazine (b), diacetone acrylamide (c) and various amounts of diacetone acrylamide hydrazone (a)-(f).

(a) Latex C was made according to the following recipe:

| Monomers | Butyl acrylate | 135 g |
|---|---|---|
| | Methyl methacrylate | 110 g |
| | Methacrylic acid | 5 g |
| Initial Aqueous Phase | Hard water | 208 g |
| | Dowfax 2A1 (45%) | 2 g |
| | Tergitol NP 35 | 3.9 g |
| | Nonidet P40 (a condensate of an octyl phenol with 8.5 moles/mole of ethylene oxide ex Shell Chemicals) | 1.3 g |
| Initial Catalyst | Ammonium persulphate | 0.1 g |
| | Water | 1 g |
| Delayed Solution | Ammonium persulphate | 0.6 g |
| | Dowfax 2A1 (45%) | 5 g |
| | Water | 30 g |

The initial aqueous phase and 15% of the monomers were introduced into a reaction vessel and heated with stirring to 70°. The initial catalyst was added and the temperature was raised to 90°. After storing at 90° for 15 minutes delayed addition of the remainder of the monomers was made over a period of 2 hours with the temperature kept at 90° throughout and for a further 30 minutes after the additions were complete. After cooling and sieving a polymer dispersion having a total solids content of 51%, a pH of 2.6 and a particle size of approximately 0.2 microns was obtained.

(b) To latex C was added a mixture of 30% hydrazine hydrate solution (5 g per 500 g of latex C) and 30% sulphuric acid (4 g per 500 g of latex C).

(c) A latex was made as for latex C except that in the monomer phase diacetone acrylamide (5 g) replaced butyl acrylate (5 g).

(d) To the latex obtained by the method of Example 3(c) was added a mixture of 30% hydrazine hydrate solution (5 g per 500 g) and 30% sulphuric acid (4 g per 500 g). The final pH of the emulsion was 4.9 after 24 hours at room temperature.

(e) A latex was made as for latex C except that diacetone acrylamide (10 g) replaced butyl acrylate (10 g). To the latex was added a mixture of 30% w/w hydrazine hydrate solution (10 g per 500 g) and 30% w/w sulphuric acid (8 g per 500 g).

(f) A latex was made as for latex C except that diacetone acrylamide (20 g) replaced butyl acrylate (20 g). To the latex was added a mixture of 30% w/w hydrazine hydrate solution (20 g per 500 g) and 30% w/w sulphuric acid (18 g per 500 g).

The adhesion of polymer films made from some of the above latices and of paint films made from the polymers was then tested, as follows.

1. Adhesion of the Polymer Films

Latices 3(a), 3(e) and 3(f) were tested. Emulsion films were applied to panels coated with alkyd gloss paint using an 0.03" applicator and muslin was laid onto the wet latex to give added strength during later testing. After drying, parallel cuts were made in the film 2 cm apart and strips of polymer were pulled back along themselves at a constant rate of 20 cm/min. using an Instron tensile tester. A peel strength figure was obtained by averaging the results of four strips. The following results were obtained:

| Latex | Peel Adhesion g |
|---|---|
| 3(a) (comparison) | 195 |
| 3(e) | 427 |
| 3(f) | Too strong to test |

2. Adhesion of the Paint Films

Paints were made up from the polymer latices using the formulation given in Example 1. The paints were then tested by the hot box method, Test 1 given in Example 1 with the following results.

| Latex | Time to failure |
|---|---|
| 3(a) (comparison) | 5 mins. |
| 3(b) (comparison) | 5 mins. |
| 3(c) (comparison) | 5 mins. |
| 3(d) | >2 hours |
| 3(e) | >2 hours |
| 3(f) | >2 hours |

The paint films were also tested for peel adhesion by the following method, Test 2.

The paint films were cast using a 0.03" applicator onto metal panels coated with alkyd paint and muslin was laid onto the wet paint to give added strength to the film during later testing. The films were left to dry overnight in a constant humidity room. Parallel cuts were made 2 cm apart along the length of the panels and strips of paint were pulled from the panels at an angle of 90° using an Instron tensile tester at a constant rate of 20 cm/min. A peel strength figure was obtained by averaging the results of peeling four strips of paint. Wet adhesion results were obtained by totally immersing the films in water for one hour and peeling the strips while wet.

| Example No. | Peel adhesion g/2 cm. | |
|---|---|---|
| | Dry | Wet |
| 3(a) | 195 | 0 |
| 3(d) | 897 | (200+) |
| 3(e) | >1500 | |

+ = cohesive failure occurs.

The wet adhesion results were obtained by totally immersing the films in water for one hour and peeling the strips whilst wet.

EXAMPLES 4-7

These Examples illustrate the use of carbonyl monomers other than diacetone acrylamide.

EXAMPLE 4

A polymer latex was prepared as for latex C in Example 3(a) except that 5 parts of crotonaldehyde replaced 5 parts of butyl acrylate. To the latex was added a mixture of 30% w/w hydrazine hydrate solution (12 g per 500 g) and 30% w/w sulphuric acid (4 g per 500 g). A paint was prepared according to the formulation in Example 1 and was tested according to Test 1, the Time to Failure being greater than 2 hours.

The paint was also tested according to Test 2 when the following Peel Adhesion figures were obtained:

| Dry | Wet |
|-----|-----|
| 704 | 186 |

EXAMPLE 5

A polymer latex was prepared as for latex C in Example 3(a) except that 5 parts of cinnamaldehyde replaced 5 parts of butyl acrylate. To the latex was added a mixture of 30% w/w hydrazine solution (6.3 g per 500 g). A paint was prepared according to the formulation in Example 1 and was tested according to Test 1, the Time to Failure being greater than 2 hours.

The paint was also tested according to Test 2 when the following Peel Adhesion figures were obtained:

| Dry | Wet |
|-----|-----|
| 704 | 186 |

EXAMPLE 6

A polymer latex was prepared as for latex C in Example 3(a) except that 90% aqueous methyl vinyl ketone (11.1 g) replaced 10 g butyl acrylate. The latex was then blended 1:1 with latex C in Example 3 and a mixture of 30% w/w hydrazine hydrate solution (12 g per 500 g) and 30% w/w sulphuric acid (4 g per 500 g) was added.

A paint was prepared according to the formulation in Example 1 and the Time to Failure in Test 1 was greater than 2 hours.

EXAMPLE 7

The N-substituted acrylamide which is the reaction product of acrylonitrile, methyl ethyl ketone and sulphuric acid was prepared by the method described in British Patent No. 1,045,869.

A polymer latex was prepared as for latex C in Example 3(a) except that 5 g of the N-substituted acrylamide replaced 5 g butyl acrylate. To the latex was added a mixture of 30% w/w hydrazine hydrate solution (4.2 g per 500 g) and 30% w/w sulphuric acid (1.5 g per 500 g). A paint was prepared according to the formulation in Example 1 and was tested according to Test 1, the Time to Failure being greater than 2 hours.

The paint was also tested according to Test 2 when the following Peel Adhesion figures were obtained:

| Dry | Wet |
|-----|-----|
| 386 | 174 |

EXAMPLE 8

This Example illustrates the use of substituted hydrazine.

A mixture of methyl hydrazine sulphate 8.5 g, sodium bicarbonate 7.5 g and water 25 g was added to 500 g of a polymer latex as in Example 3(e).

A paint was prepared according to the formulation in Example 1 and the Time to Failure in Test 1 was greater than 2 hours.

EXAMPLE 9

This Example illustrates the effect of various levels of diacetone acrylamide hydrazone in a polymer latex.

A polymer latex was made according to the following recipe:

| | | |
|---|---|---|
| Initial Aqueous Phase | Hard water | 200g |
| | Rohagit S/MV (An alkali soluble methacrylic acid/methyl methacrylate copolymer ex Rohm GmbH) Ammonia soln (S.G. = 0.910) | 6g |
| | Potassium carbonate | 0.26g |
| | Formic acid | 0.13g |
| | Calsolene oil H.S. (ex I.C.I.) | 7.5g |
| Initial Monomers | Methyl methacrylate | 25g |
| | 2-Ethylhexyl acrylate | 25g |
| | Carbon tetrachloride | 0.06g |
| Initial Catalyst | Ammonium persulphate | 0.27g |
| | Hydrogen peroxide (35% w/v) | 0.25g |
| | Hard water | 20g |
| Monomers | Methyl methacrylate | 100g |
| | 2-Ethylhexyl acrylate | 99g |
| | Carbon tetrachloride | 0.26g |
| Delayed Catalyst | Ammonium persulphate | 0.23g |
| | Hydrogen peroxide (35% w/v) | 0.20g |
| | Hard water | 20g |

The initial aqueous phase and the initial monomers were charged to a reactor vessel and heated to 70°. The initial catalyst was added to the stirred mixture and the temperature raised to 90°. After 15 minutes at this temperature, addition of the delayed monomers was begun at such a rate as to be complete in 2 hours. 15 Minutes after the start of delayed monomer addition, the delayed catalyst addition was begun, addition being made over 2 hours. The temperature of the batch was maintained at 90° throughout and for a further 30 minutes after the additions were finished. The product was then cooled and sieved to give a fairly coarse emulsion of about 52% solids and pH 8–9.

EXAMPLES 10–14

Emulsions were made as for Example 9 except that various weights of diacetone acrylamide replaced an equal weight of methyl methacrylate in the delayed monomers. The emulsions were finally treated with 30% w/w hydrazine hydrate solution. The pH of the emulsions remained above 7. The amounts of reactants used are given below.

| Example No. | Wt of diacetone acrylamide | 30% w/w Hydrazine hydrate |
|---|---|---|
| 10 | 0.32g | 0.3g |
| 11 | 0.63g | 0.6g |
| 12 | 1.25g | 1.25g |
| 13 | 5g | 5g |
| 14 | 5g | 5g |

After allowing the emulsions to react at room temperature for 24 hours (for Examples 10–13) or at 90° for 2 hours (Example 14), paints were made up from them using the formulation given in Example 1. They were tested for adhesion by the hot box method, Test 1, and by the peel method, Test 2, explained before. The following results were obtained.

| Example No. | Hot Box-time to fail | Peel adhesion g/2 cm | |
|---|---|---|---|
| | | Dry | Wet |
| 9 (comparison) | 5 mins | 178 | 0 |
| 10 | 50 mins | 289 | 54 |
| 11 | 40 mins | 396 | 203 |
| 12 | 50 mins | 533 | 220* |
| 13 | >2 hours | >1500 | |
| 14 | >2 hours | >1500 | |

EXAMPLES 15 AND 16

These Examples illustrate the use of a soluble diacetone acrylamide/methacrylic acid copolymer as a stabilising colloid in a butyl acrylate/methylmethacrylate copolymer emulsion, with and without the addition of hydrazine.

EXAMPLE 15

A polymer emulsion was made using the following recipe. Methacrylic acid (3.5 g), diacetone acrylamide (2.5 g) and hard water (206 g) were charged to a reactor vessel, heated to 65° and ammonium persulphate solution (10% w/v, 1.7 ml) was added. The temperature of the mixture was raised to 85° for 30 minutes, and then lowered to 70°. The water insoluble copolymer was then dissolved by adding

| | Ammonia solution (S.G. = 0.910 | 6g |
|---|---|---|
| followed by | Dowfax 2A1 (45%) | 1.5g |
| | Tergitol NP 40 (a condensate of a nonyl phenol with 20 moles of ethylene oxide per mole ex Union Carbide) | 2.5g |
| & | Sulphole (t-dodecyl mercaptan) | 2g |

10% of the mixture of monomers (butyl acrylate 122 g + methyl methacrylate 119 g) was added followed by the initial catalyst; Ammonium persulphate (10% w/v, 1 ml). The temperature of the batch was raised to 90° C., and held at this temperature for 15 minutes. Addition of the remainder of the monomers was made over 3 hours and addition of the delayed catalyst (ammonium persulphate 0.5 g in water 30 g) was made over 3¼ hours. The temperature was held at 90° throughout the addition and for a further 30 mins. The emulsion was then cooled and sieved.

EXAMPLE 16

A polymer emulsion was made as for Example 15 except that hydrazine hydrate solution (30% w/w, 5 g) was added to the final product at room temperature.

Paints were made up from these emulsions using the formulation given in Example 1 and were tested for adhesion by the hot box method (Test 1) and peel method (Test 2) already described. The following results were obtained.

| Example No. | Hot Box-time to fail | Peel adhesion g/2 cm | |
|---|---|---|---|
| | | Dry | Wet |
| 15 | 5 mins | 142 | 20.2 |
| 16 | 3 hours | 220 | 159 |

EXAMPLES 17-22

These Examples illustrate the effect on the wet adhesion properties of the incorporation of various amounts of diacetone acrylamide hydrazone into a vinyl acetate/VeoVa 10 copolymer latex.

EXAMPLE 17

A latex was made using the following recipe:

| Initial aqueous phase | Soft water | 164g |
|---|---|---|
| | Natrosol 25OL (hydroxyethyl cellulose, ex Hercules Powder Co.) | 5.5g |
| | Sodium bicarbonate | 0.75g |
| | Aerosol OT (60%) (sodium dioctyl sulphosuccinate ex American Cyanamid Co.) | 1.85g |
| | Crotonic acid | 0.45g |
| Initial monomer | Vinyl acetate | 25g |
| Initial catalyst | Potassium persulphate | 0.3g |
| | Water | 10g |
| Delayed monomers | Vinyl acetate | 176g |
| | VeoVa 10 (vinyl ester of a C10 carboxylic acid, ex Shell) | 48g |
| | Carbon tetrachloride | 0.13g |
| Delayed catalyst solution | Potassium persulphate | 0.6g |
| | Antarox CO 880 (25% w/w solution) (a condensate of a nonyl phenol with 30 moles/mole of ethylene oxide ex General Aniline & Film Corp.) | 10.4g |
| | Nonidet P80 | 2.6g |
| | Soft water | 24g |

The stirred mixture of initial aqueous phase and initial monomer was heated to 60° in a reactor vessel and the initial catalyst was added. The temperature was raised to 80° and when the reflux due to unreacted monomer had stopped, addition of delayed monomer and of delayed catalyst was begun. The monomer was added over 4 hours and the catalyst over 4¼ hours, keeping the temperature at 80°-82° during the additions and for a further 30 minutes. The emulsion was cooled and sieved. The final pH was approximately 4.

EXAMPLES 18-22

Various weights of diacetone acrylamide replaced an equal weight of vinyl acetate in the delayed monomers, in the recipe in Example 17. After the emulsion was cooled, a mixture of 30% w/w hydrazine hydrate solution and 30% w/w sulphuric acid was added.

| Example No. | DAAm | 30% hydragine hydrate | 30% sulphuric acid |
|---|---|---|---|
| 18 | 0.63g | 0.6g | — |
| 19 | 1.25g | 1.2g | — |
| 20 | 2.5g | 2.5g | 1.5g |
| 21 | 5g | 5g | 4g |
| 22 | 10g | 10g | 5g |

The final pH's of the emulsions were approximately 4-5.

Paints were made up from the above emulsions prepared in Examples 17 to 22 according to the formulation in Example 1 and were tested as before. The following results were obtained:

| Example No. | Test 1-Hot box time to fail | Test 2-Peel Adhesion g/2 cm | |
|---|---|---|---|
| | | Dry | Wet |
| 17 | 5 mins | 19 | 0 |
| 18 | 5 mins | 21.6 | 4.5 |
| 19 | 5 mins | 26.8 | 18 |
| 20 | >2 hours | — | — |

-continued

| Example No. | Test 1-Hot box time to fail | Test 2-Peel Adhesion g/2 cm | |
|---|---|---|---|
| | | Dry | Wet |
| 21 | >2 hours | — | — |
| 22 | >2 hours | — | — |

EXAMPLE 23

This Example illustrates the incorporation of diacetone acrylamide into a vinyl acetate/VeoVa 10 copolymer emulsions as an aqueous solution during the polymerisation process.

An emulsion was made as for Example 21 except that the diacetone acrylamide was added as a delayed aqueous solution (in 30 g of water, using 134 g of water in the initial aqueous phase) which was added during the same time as the monomers.

The paint was made according to Example 1 and was tested as before. The following results were obtained:

| Test 1-Hot box time to fail | Test 2-Peel Adhesion g/2 cm | |
|---|---|---|
| | Dry | Wet |
| >2 hours | 148 | 109* |

*Cohesive failure occurred.

EXAMPLE 24

This Example illustrates the use of a methylmethacrylate/acrolein copolymer as the carbonyl monomer which is graft copolymerised onto a vinyl acetate/VeoVa 10 copolymer and then treated with hydrazine.

An emulsion was made as for Example 17. To 400 g of this stirred emulsion was added at room temperature

| Water | 17g |
|---|---|
| t-butyl hydrogen peroxide | 0.2 ml |
| followed by a mixture of | |
| methyl methacrylate | 16g and |
| acrolein | 4g |

After stirring for 5 mins a 10% w/w solution of sodium formaldehyde sulphoxylate (3 ml) was added. After 2 hours a further 0.2 mls of t-butyl hydrogen peroxide and 3 mls of 10% sodium formaldehyde sulphoxylate were added separately. After standing overnight a mixture of 30% hydrazine hydrate (12 g) and 30% sulphuric acid (8 g) was added to the graft copolymer emulsion.

A paint was prepared according to the formulation in Example 1 and the Time to Failure in Test 1 was greater than 2 hours.

EXAMPLES 25 and 26

These Examples illustrate latex blends, only one component of which is hydrazine modified. Blends of modified and unmodified emulsions were made as follows:

| Example No. | Modified emulsion (20% by weight) | Unmodified emulsion (80% by weight) |
|---|---|---|
| 25 | Emulsion as made in Example 3(e) (made alkaline with ammonia) | + Emulsion as made in Example 9 + Emulsion |
| 26 | Emulsion as made in Example 3(e) (made alkaline with ammonia) | as made in Example 17 |

Paints made from these emulsions were tested by the hot box method, Test 1. The following results were obtained:

| Example No. | Time to fail |
|---|---|
| 25 | >2 hours |
| 26 | >2 hours |

EXAMPLES 27-30

These Examples illustrate the use of the present invention in different types of copolymer latices.

EXAMPLE 27

An emulsion was made according to the following recipe.

| Initial aqueous phase | Hard water | 207g |
|---|---|---|
| | Dowfax 2A1 (45%) | 1.6g |
| | Nonidet P80 | 2.5g |
| Monomers | Styrene | 135g |
| | 2-Ethylhexyl acrylate | 100g |
| | Methacrylic acid | 5g |
| | Methyl methacrylate | 6.5g |
| | Dibutyl phthalate | 3.75g |
| Initial catalyst | Ammonium persulphate solution (10% w/w) | 1g |
| Delayed catalyst | Ammonium persulphate | 0.5g |
| | Water | 30g |
| | Dowfax 2A1 (45%) | 5g |

The initial aqueous phase and 15% of the monomers were heated to 70° with stirring in a reactor vessel and the initial catalyst was added. The temperature of the batch was raised to 90° and held for 15 minutes. Addition of the remainder of the monomers and of the delayed catalyst was begun, the additions being made over 2 and 2¼ hours respectively. The temperature was maintained at 90° throughout the additions and for a further 30 minutes. The polymer emulsion was then cooled and sieved and the pH was raised to 9 with diluted ammonia solution.

EXAMPLE 28

An emulsion was made as for Example 27 except that diacetone acrylamide (5 g) replaced an equal weight of styrene. 30% w/w hydrazine hydrate solution (5 g) was added instead of the ammonia.

Paints made from these emulsions were tested by the hot box method, Test 1. The following results were obtained:

| Example No. | Time to fail |
|---|---|
| 27 | 5 mins |
| 28 | >2 hours |

EXAMPLE 29

A polymer emulsion was made using the following recipe.

| Initial aqueous phase | Natrosol 25OL | 6.6g |
|---|---|---|
| | Hard water | 186g |
| | Calsolene oil | 4.4g |
| | Formic acid | 0.14g |
| Initial monomers | Vinyl acetate | 21g |
| | Di (2-butoxyethyl) phthalate | 0.25g |
| | Butyl carbitol acetate | 0.15g |
| | Carbon tetrachloride | 0.02g |
| Initial catalyst | Hydrogen peroxide | 0.31g |
| | Ammonium persulphate | 0.33g |
| | Water | 10g |
| Delayed monomers | Vinyl acetate | 222g |
| | Di (2-butoxyethyl) phthalate | 2.55g |
| | Butyl carbitol acetate | 1.45g |
| | Carbon tetrachloride | 0.14g |
| | Butyl acrylate | 49g |
| Delayed solution | Potassium carbonate | 2g |
| | Water | 20g |
| Delayed catalyst | Hydrogen peroxide | 0.5g |
| | Ammonium persulphate | 0.55g |
| | Water | 22g |

The initial aqueous phase and the initial monomers were charged to a reactor vessel and hested with stirring to 60°. The initial catalyst was added and the temperature of the mixture was raised to 80°. After 15 minutes at this temperature, additions of the delayed monomers, delayed catalyst and carbonate solutions were begun, the times of addition being 3, 3¼, and 3 hours respectively. The temperature was maintained at 80° during the additions and raised to 90° for the next 30 minutes. The mixture was then cooled and sieved.

EXAMPLE 30

A polymer emulsion was made as for Example 29 except that in the delayed monomers 6 g of diacetone acrylamide replaced an equal weight of vinyl acetate. The product was finally treated with a mixture of 30% w/w hydrazine hydrate solution (6 g) and 30% w/w sulphuric acid (2.7 g).

Paints were made from these emulsions and tested by the hot box method, Test 1, as described before.

| Example No. | Time to fail |
|---|---|
| 29 | 5 mins |
| 30 | 20 mins |

EXAMPLE 31

This Example illustrates the addition of the reaction products of hydrazine with simple saturated carbonyl compounds to polymer latices to obtain improved wet adhesion.

(a) A polymer dispersion was made according to the following composition:

| Monomers | Methyl methacrylate | 145g |
|---|---|---|
| | 2-Ethylhexyl acrylate | 105g |
| | Carbon tetrachloride | 0.5g |
| Initial aqueous phase | Hard water | 196g |
| | Rohagit S/MV (an alkali-soluble methyl methacrylate/methacrylic acid copolymer ex Rohm GmbH) | 6g |
| | Ammonia solution (s.g.-0.910) | 6g |

| | | |
|---|---|---|
| | Calsolene oil HS (ex I.C.I.) | 7.5g |
| | 1% Copper sulphate solution | 0.2g |
| Initial catalyst | Hydrogen peroxide (35% w/v) | 0.14g |
| | Ammonium persulphate | 0.20g |
| | Hard water | 2.5g |
| Delayed catalyst | Hydrogen peroxide (35% w/v) | 0.4g |
| | Ammonium persulphate | 0.5g |
| | Water | 30g |

The initial aqueous phase and 10% by weight of the monomers were heated to 80° C. in a reactor vessel equipped with a stirrer and the initial catalyst solution was added. The temperature of the mixture was raised to 90° C. for 15 minutes and then dropwise additions of the remainder of the monomers and of the delayed catalyst solution were begun at such a rate that the monomer addition was complete after 2 hours and the catalyst addition was complete after 2¼ hours. The temperature was maintained at 90° throughout the additions and for a further 30 minutes. The polymer emulsion was then cooled and sieved. The product had a particle size of about 0.3 microns and a total solids content of about 52%.

(b) A solution was made from the following compounds:

| Acetone | 0.5g |
|---|---|
| Water | 3.5g |
| 62% Hydrazine hydrate | 0.35g |
| Hydrazinum sulphate | 0.7g |
| Sodium acetate | 0.12g |

The mixture was left to stand at room temperature for 24 hours, then 1 ml of ammonia solution (s.g. - 0.910) was added. The solution was then added to emulsion (a) (200 g). (c) An emulsion was made as above except that methyl ethyl ketone (0.65 g) replaced the acetone. (d) An emulsion was made as above except that the ketone was diacetone alcohol (1.0 g)

The unmodified emulsion (a) and emulsions (b), (c) and (d) according to the present invention were then used to make up paints according to the formulation given in Example 1. When tested by the hot box method, Test 1, the following results were obtained:

| | Time to Failure |
|---|---|
| Emulsion (a) | 5 mins |
| Emulsion (b) | 60 mins |
| Emulsion (c) | 20 mins |
| Emulsion (d) | 10 mins |

When tested for peel adhesion by Test 2, the following results were obtained:

| | Peel Force (g/2 cm) | |
|---|---|---|
| | Dry | Wet |
| Emulsion (a) | 76 | 0 |
| Emulsion (b) | 78 | 60 |
| Emulsion (c) | 43 | 44 |
| Emulsion (d) | 70 | 12.5 |

We claim:

1. A polymer latex composition comprising a polymer latex containing at least one component which contains a group which has hydrazone or azine linkages produced by the reaction of a keto or aldehydo carbonyl group on the polymer and a hydrazine in an amount sufficient to improve the wet adhesion properties of the polymer latex composition.

2. A polymer latex as claimed in claim 1, wherein the hydrazine is hydrazine.

3. A polymer latex as claimed in claim 1, wherein the content of said hydrazine-modified groups, calculated as weight nitrogen on weight latex solids, is at least 0.01%.

4. A polymer latex as claimed in claim 3, wherein the content of hydrazine-modified groups lies in the range of from 0.1 to 1%.

5. A polymer latex as claimed in claim 1, wherein the hydrazinemodified group has been chemically incorporated into the main polymer of the latex.

6. A polymer latex as claimed in claim 5, wherein the main polymer is one containing units derived from an active carbonyl compound.

7. A polymer latex as claimed in claim 4, wherein the active carbonyl compound is one containing a carbon-to-carbon double bond.

8. A polymer latex as claimed in claim 7, wherein the active carbonyl compound is one having the formula

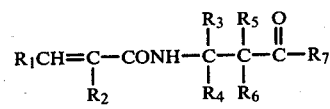

wherein $R_1$ represents hydrogen, a lower alkyl radical or the group

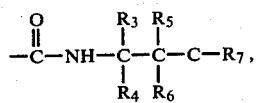

$R_2$ represents hydrogen, a lower alkyl radical or the group

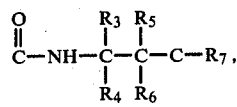

wherein $R_3$, $R_4$, $R_5$ and $R_6$, any two or more of which may be the same or different, each represents hydrogen or a hydrocarbon radical as hereinbefore defined, and $R_7$ represents a hydrocarbon radical, as hereinbefore defined.

9. A polymer latex as claimed in claim 8, wherein the active carbonyl compound is an N-3-oxyhydrocarbon-substituted acrylamide.

10. A polymer latex as claimed in claim 9, wherein the active carbonyl compound is diacetone acrylamide.

11. A polymer latex as claimed in claim 9, wherein the active carbonyl compound is di(methylethyl ketone) acrylamide.

12. A method of improving the adhesion properties of a polymer latex which comprises chemically incorporating a hydrazine-modified carbonyl group into one of the components thereof.

13. A method as claimed in claim 12, wherein the hydrazinemodified carbonyl group is chemically incorporated into the main polymer of the latex.

14. A method as claimed in claim 13, wherein the main polymer contains units derived from the reaction product of diacetone acrylamide and hydrazine.

15. A polymer latex as claimed in claim 1 in which the polymer is an acrylic polymer.

16. A polymer latex as claimed in claim 2 in which said polymer a methyl methacrylate polymer.

17. The composition of claim 8 in which the polymer in the latex contains polymers derived from monoethylenically unsaturated monomers which are copolymerizable with said carbonyl compound.

* * * * *